Oct. 18, 1949.   C. B. HATFIELD   2,484,945
AUTOMATIC FLUID MIXING APPARATUS
Filed Dec. 10, 1945   5 Sheets-Sheet 1
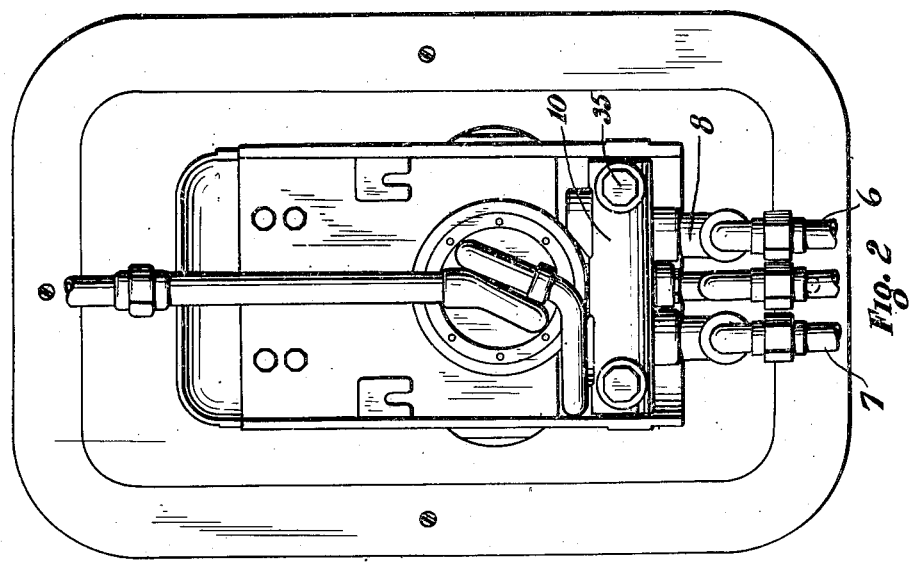
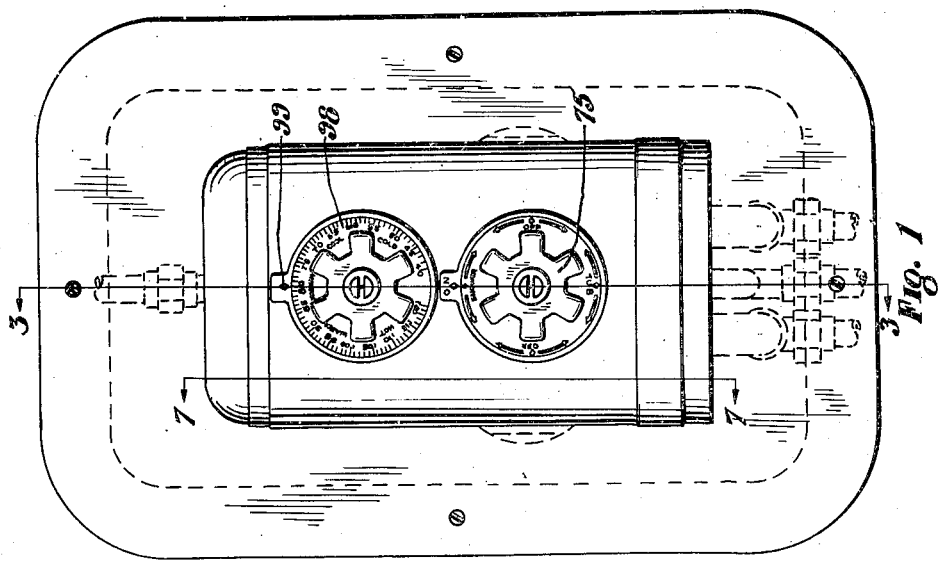
Inventor
*Cleburne Barnes Hatfield*
By
Attorney

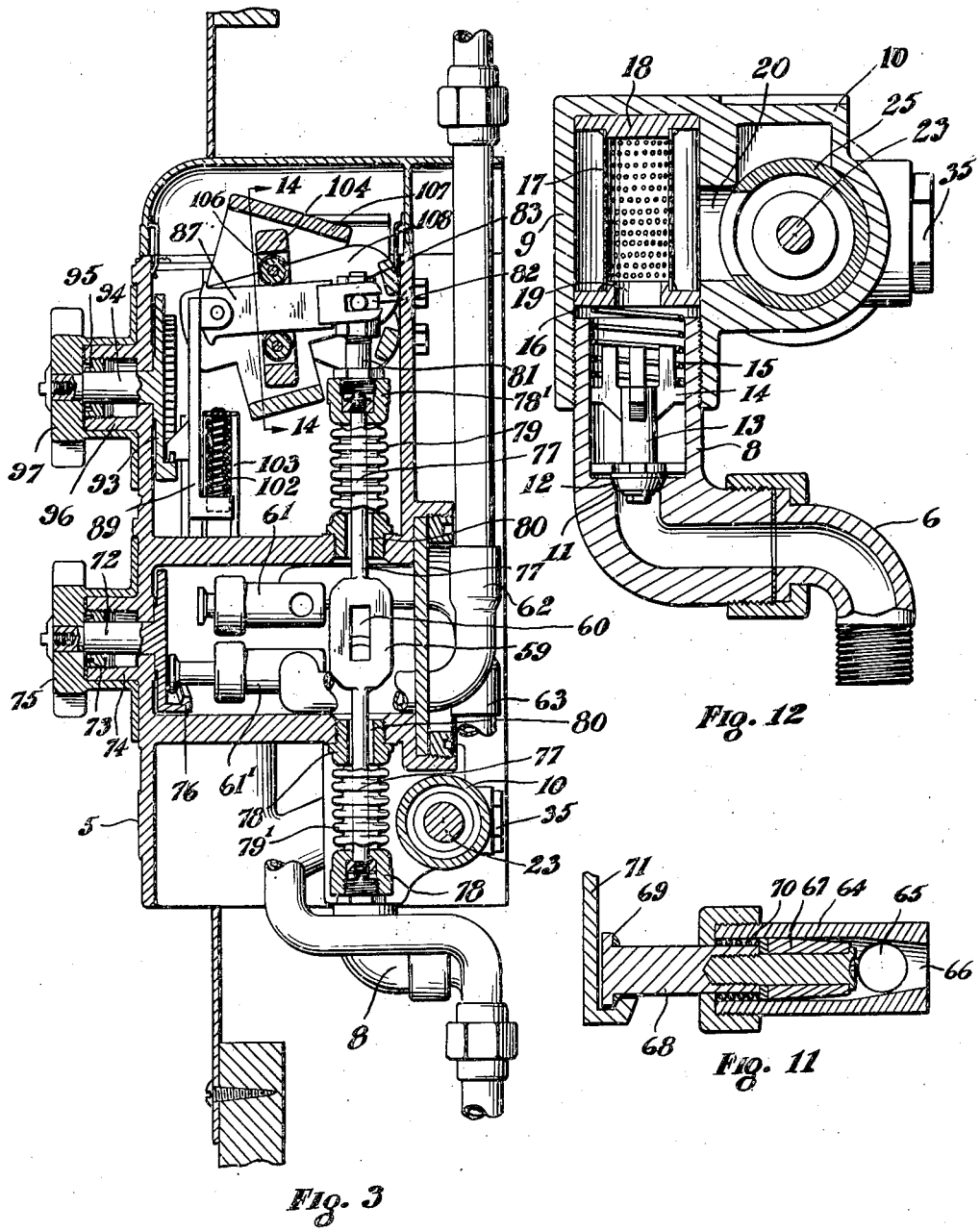

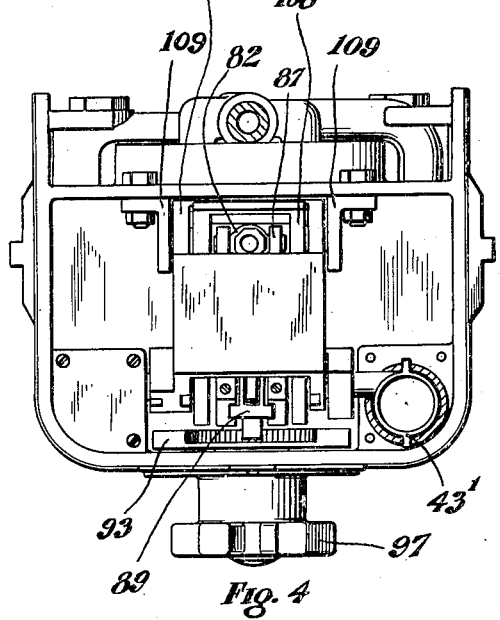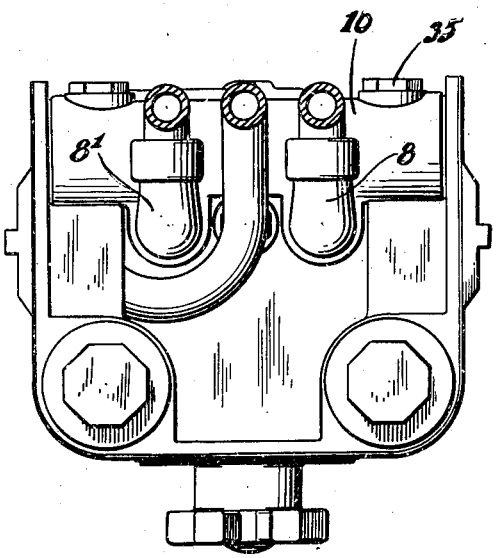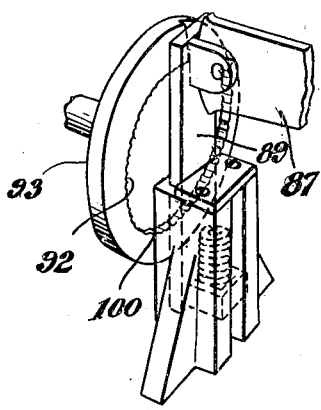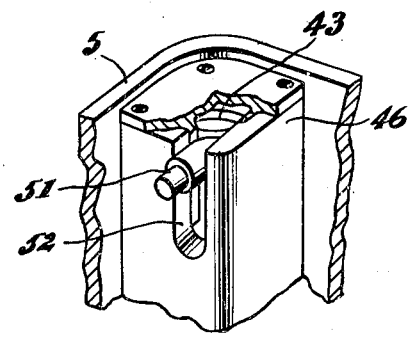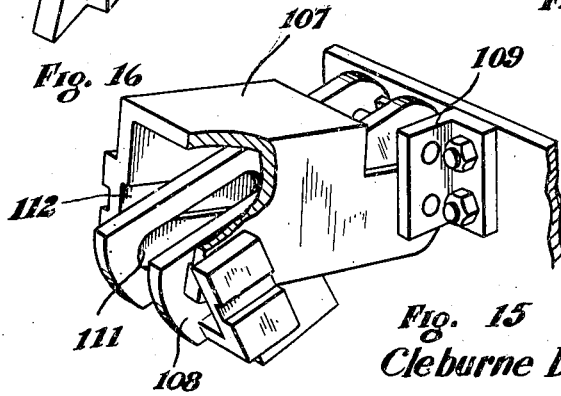

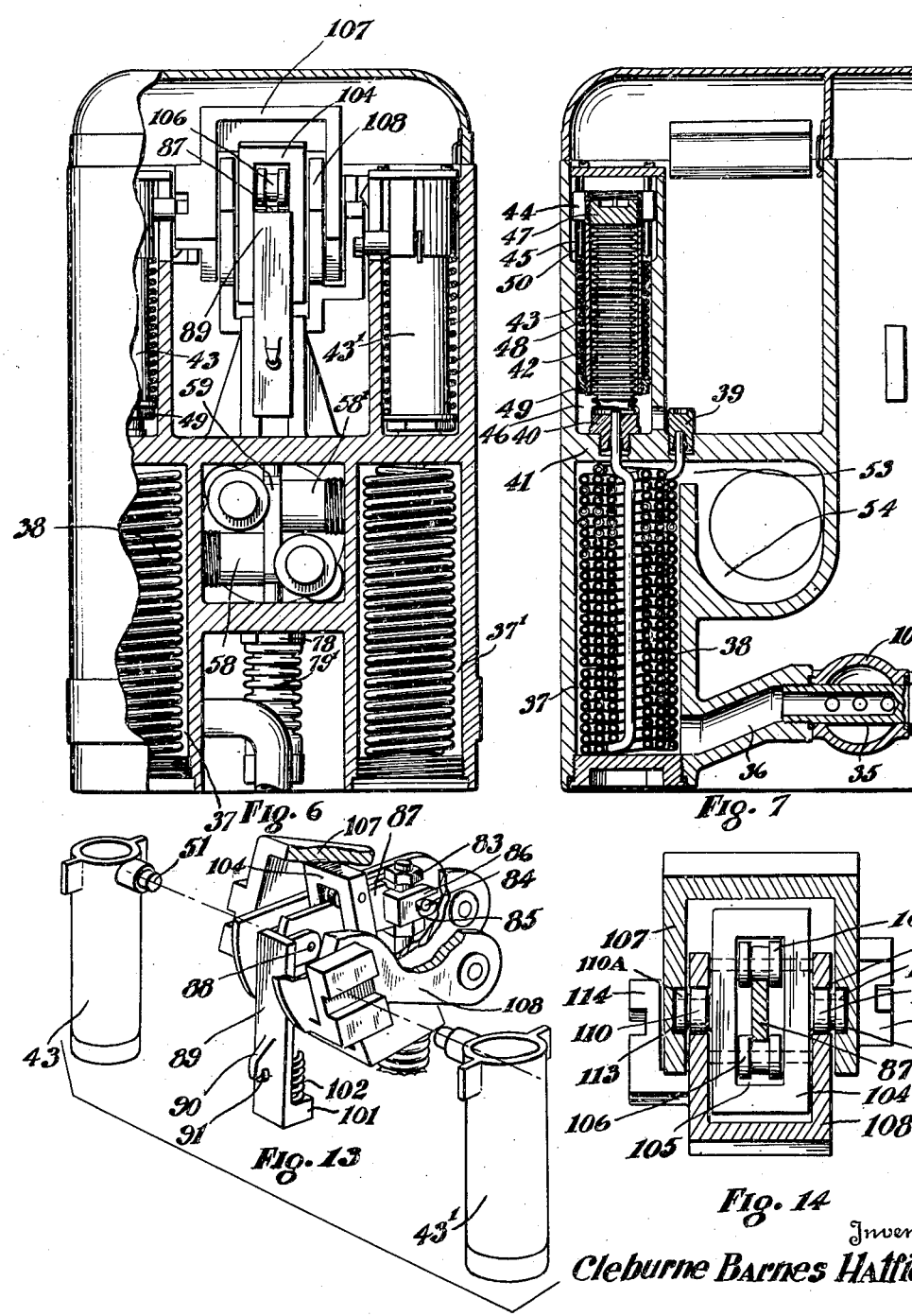

Oct. 18, 1949.  C. B. HATFIELD  2,484,945
AUTOMATIC FLUID MIXING APPARATUS
Filed Dec. 10, 1945  5 Sheets-Sheet 5

Inventor
Cleburne Barnes Hatfield

Attorney

Patented Oct. 18, 1949

2,484,945

UNITED STATES PATENT OFFICE 2,484,945

AUTOMATIC FLUID MIXING APPARATUS

Cleburne B. Hatfield, Cookeville, Tenn.

Application December 10, 1945, Serial No. 633,944

10 Claims. (Cl. 236—12)

This invention relates to automatic fluid mixing and temperature regulating apparatus adapted to continuously maintain a mixture of hot and cold fluids at a predetermined temperature.

While the principle of the apparatus disclosed may be used to regulate the temperature of fluids for various uses, the one here illustrated is designed specifically for household use to regulate the temperature of water supplied for bath, shower or other purposes.

One of the objects of the invention resides in providing a thermostatic actuated regulating mechanism which operates a valve for mixing the hot and cold water in the proportions calculated to produce a mixture of the desired temperature.

A further object of the invention resides in providing a mixing valve operated by a regulating mechanism that is constantly influenced by the temperature of the input of hot and cold water to insure a uniform temperature of the resulting mixture without any fluctuations in the temperature.

Another object of the invention is to provide mechanism of the above-mentioned character which is simple and durable in construction, reliable and efficient in operation and inexpensive to manufacture.

Other objects and advantages of the invention will be apparent during the course of the following description.

Figure 8:
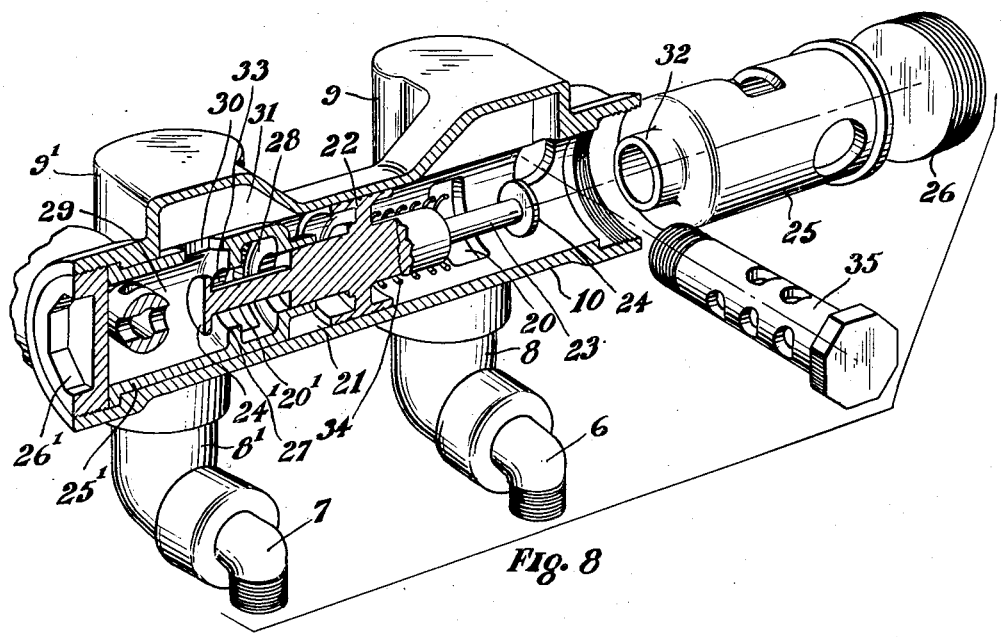
Figure 9:
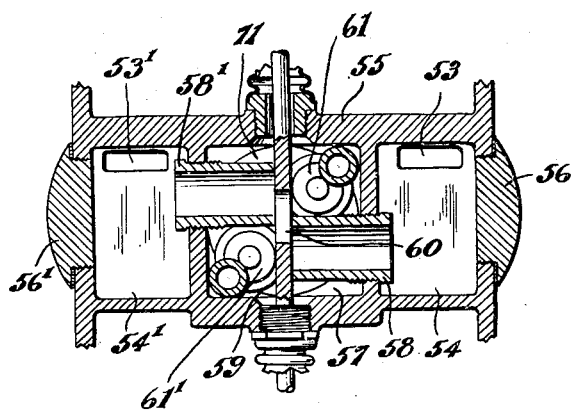
Figure 10:
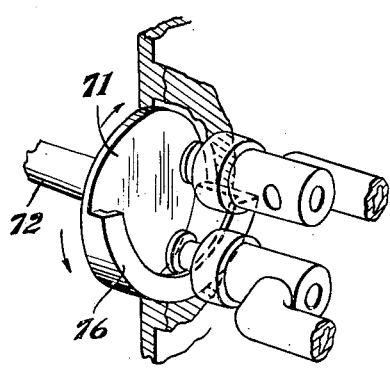

In the accompanying drawings forming a part of this specification and in which like numerals are employed to designate like parts throughout the same, Fig. 1 is a front elevational view of the apparatus, Fig. 2 is a rear view of the same, Fig. 3 is a vertical section taken on the line 3—3 of Fig. 1, Fig. 4 is a top view with the top of the casing removed, Fig. 5 is a bottom view, Fig. 6 is a front view with the wall of the casing broken away, Fig. 7 is a vertical section taken on the line 7—7 of Fig. 1, Fig. 8 is an exploded view of the pressure equalizing valve, Fig. 9 is a longitudinal sectional view of the mixing valve, Fig. 10 is a perspective view of the cam for controlling the discharge valves, Fig. 11 is a longitudinal sectional view of one of the discharge valves, Fig. 12 is a sectional view of the inlet check valve and filter, Fig. 13 is a perspective view of the temperature regulating mechanism and the actuating members, Fig. 14 is a section taken on line 14—14 of Fig. 3, Fig. 15 is a perspective view of the regulating mechanism with parts broken away, Fig. 16 is a perspective view of the temperature regulator cam, and, Fig. 17 is a perspective view of one of the thermostatically actuated arms for operating the temperature regulating mechanism.

In the drawings wherein for the purpose of illustration a preferred embodiment of the invention is shown the numeral 5 denotes generally the casing for the fluid mixing and temperature regulating mechanism which in the present instance is designed for the household water supply to a bath and shower. The hot and cold water supply pipes 6 and 7 of the water supply system extend up through the bottom of the casing and are each connected to a pipe elbow 8, 8', as more clearly shown in Fig. 12, which in turn are threadedly connected to the filter chambers 9, 9' formed integral with the ends of the pressure equalizing valve chamber 10 shown in Fig. 8. The flow of water through the elbows is controlled by a check valve 11 which is normally seated on the valve seat 12 formed in the elbow. The valve stem 13 is provided with spaced radial arms 14 at its upper end which guide the movement of the valve and serve as a seat for the lower end of the expansion spring 15. The upper end of the spring bears against the lower plate 16 of the cylindrical strainer element 17, and normally holds the check valve closed. The strainer element 17 is mounted between the lower plate 16 and upper plate 18, the plate 16 having a central opening 19 through which the water flows into the strainer element. The water passes through the perforations of the strainer element into the filter chamber. Each of the filter chambers 9, 9' have communication with the pressure equalizing valve chamber 10 through openings 20, 20'. The intermediate portion of the chamber 10 forms a piston chamber 21 in which a piston 22 is mounted to reciprocate. A piston rod 23 extends from each side of the piston and has formed on its free ends valve heads 24, 24'. A tubular liner 25, 25' is fitted in each end of the valve chamber 10 and are secured therein by screw plugs 26, 26'. Each liner is divided by a partition wall 27 into chambers 28 and 29, the chamber 28 of each liner being in communication with the filter chambers through openings 20, 20' while the chamber 29, through opening 30 communicates with the passage 31 leading to the piston chamber 21. The piston rod 23 extends through the reduced ends 32 of the liners 25, 25' and the opening 33 in the partition wall 27. Upon movement of the piston the valve heads on the ends of the piston rod are moved towards or from the openings 33 to change the size of the opening and thus regulate the flow of water therefrom. The cold water flows into one end of the equalizing valve chamber while the hot water flows into the other end. The pressure of water against opposite sides of the piston, if unequal, will cause the piston to move the valve heads so as to reduce the flow of water of greatest pressure until the pressure of the hot and cold water is equal. To prevent scalding of the user, if the flow of cold water ceases, a coil spring 34 is mounted on the piston rod 23 which normally moves the piston in a direction to shut off the flow of hot water. A perforated tube 35 extends transversely through the outer ends of the chambers 29, 29' which connect with the passages 36 leading to the lower end of the thermostatic chambers 37, 37', a separate chamber being provided for the hot and cold water supply, as shown in Figs. 6 and 7.

The chambers 37, 37' are each filled with a continuous coiled copper tubing 38 having a series of concentric convolutions to insure a large contact area with the water passing through the chambers. One end of the tubing is sealed by a plug 39 while the opposite end extends through the apertured plug 40 screwed in an opening in the partition 41. The lower end of a metal bellows 42 is connected to the plug 40 and a sleeve 43 is mounted over the upper end of the bellows having radial lugs 44 slidably mounted in longitudinal slots 45 formed in the wall of the bellows chamber 46. A plug 47 is screwed in the upper end of the sleeve in contact with the upper end of the bellows and permits adjustment of the sleeve with respect to the bellows. A coil spring 48 is mounted on the sleeve with its lower end seated on the collar 49 secured to the lower end of the sleeve and its upper end bearing against the bushing 50. The tubing and bellows are completely filled with a suitable thermal expansible liquid such as oil, which upon expansion causes the bellows to expand thus moving the sleeve 43 upward. When the liquid contracts the spring 48 forces the bellows to contract and move the sleeve downward. A trunnion 51 projects radially from the upper end of the sleeve 43 through a longitudinal slot 52 in the wall of the bellows chamber, as shown in Fig. 17, for connection with the regulating mechanism to be described hereinafter.

The hot and cold water passes from their respective thermostatic chambers 37, 37' through openings 53 into chambers 54, 54' in the ends of the mixing valve casing 55 closed at its ends by screw plugs 56, 56', as shown in Fig. 9. A mixing chamber 57 is intermediate the chambers 54, 54' and the hot and cold water pass through the tubes 58, 58' from their respective chambers into the mixing chamber. The tubes 58, 58' are disposed out-of line with their discharge ends in sliding contact with opposite sides of a slide valve plate 59 more clearly shown in Fig. 3. The slide valve plate is slidably mounted through the mixing chamber and has a central elongated opening 60 which upon up and down movement proportions the amount of hot and cold water allowed to flow from the tubes 58, 58' into the mixing chamber. A pair of discharge valves 61, 61' are disposed within the mixing chamber 57, one being connected to a pipe 62 leading to the shower and the other connected to a pipe 63 leading to the tub. As the valves 61, 61' are identical in construction the description of one will suffice. As shown in Fig. 11 the valve casing 64 is provided with an outlet 65 in its side wall and inlet 66 in one end which are normally closed by a reciprocating plug valve 67. The plug valve is connected to the end of a plunger 68 which projects from the valve casing and has a flange 69 surrounding its outer end. A coil spring 70 is mounted on the plunger between the plug valve and end of the casing for holding the valve in closed position.

The plungers of valves 61, 61' are operated to open the valves by a rotatable disk 71, more clearly shown in Fig. 10. A shaft 72 extends from the disk through a bearing 73 mounted in a packing gland 74 on the face of the casing 5 and has a hand wheel 75 connected thereto for turning the shaft to rotate the disk. An L-shape cam flange 76 partially surrounds the edge of the disk adapted to contact the flange 69 of the valve plungers 68 upon rotation of the disk. As the disk rotates the flange 69 travels along the cam surface thus retracting the plunger to open the valve. The disk may be selectively brought into operative engagement with either of the valves 61, 61' to regulate the flow of water to the shower or tub as desired.

As shown in Fig. 3, the slide valve 59 has a rod 77 extending from opposite ends that is slidably mounted in bushings 78 in the walls of the mixing chamber. The upper and lower ends of rod 77 are attached to the upper and lower ends of metal bellows 79, 79' which surround the rod and have their opposite ends connected to bushings 78 and 78'. Water from the mixing chamber flows through passages 80 and fills the bellows 79 and 79' to exert an equal pressure at opposite ends of the valve rod.

A stem 81 is attached to the upper end of bushing 78' for supporting a bearing block 82 adjustably held in place by nuts 83. The bearing block 82 has oppositely extending trunnions 84 which pivotally engage in the slots 85 of a yoke 86 formed integral with the end of an adjustable bar 87 forming part of the temperature regulating mechanism shown more clearly in Figs. 13 and 14. The opposite end of bar 87 is pivotally attached as at 88 to the upper end of a vertically adjustable bar 89 having an arm 90 projecting from its face which supports a roller 91 adapted to engage a cam surface 92 formed on a rotatable disk 93. A shaft 94 extends from the disk through a bearing 95 mounted in a packing gland 96 formed on the face of the casing 5 and a hand wheel 97 is attached to the end of the shaft for turning the disk. A dial 98 having the degrees of temperature marked thereon is carried by shaft 94 on the face of casing 5 and by turning the hand wheel 97 until the desired degree of temperature on the dial is opposite a pointer 99, the bar 89 will be adjusted vertically so the regulating mechanism will automatically regulate the mixing valve to produce water of a temperature indicated on the dial. The cam surface 92 is serrated forming notches 100 to receive roller 91 and hold bar 89 in its adjusted position. The lower end of bar 89 has an angular extension 101 to provide a seat for the lower end of a coil spring 102 confined within a frame 103. The spring exerts a downward pressure on bar 89 and holds the pivot point 88 of bar 87 in its adjusted position. A movable pivot block 104 is slidably mounted on bar 87. As shown in Fig. 14 the block has a central slot 105 through which the bar 87 extends and mounted in the ends of the slot are rollers 106 which ride on the edges of the bar and provide for free sliding movement of the block longitudinally of the bar. By reason of this construction the bar 87 is rockably mounted in the slot of the block so that when adjusting bar 89 is moved up or down, the bar 87 will be rocked to raise or lower the slide valve in the mixing chamber. The block 104 is straddled by oppositely disposed interfitting U-shaped members 107, 108, pivotally mounted at one end between brackets 109 in crossed relation. Rollers 110 mounted on pins extending from opposite sides of the block 104 engage in slots 111 formed in the flanges of member 108, and rollers 110A mounted on the outer ends of the same pins, engage in grooves 112 formed in the flanges of member 107 whereby relative movement between the members 107 and 108 will cause block 104 to be shifted up or down, forward or backward, or both movements simultaneously, to cause bar 87 to rotate about its pivot point 88, raising or lowering trunnions 84 and bearing block 82, thus regulating the movement of the mixing valve rod. The members 107 and 108 have slotted bosses 113 and 114 formed on the outer face of opposite sides to receive trunnions 51 of the sleeves 43 thus operatively connecting the temperature regulating mechanism with the thermostatically controlled bellows of the hot and cold water supply.

In operation, the cold water from the supply line 7 and hot water from the supply line 6 enter the fluid pressure equalizing chamber 10 and from there the hot and cold water flows to separate thermostatic chambers 37, 37' having thermostatic means therein responsive to the temperature of the water to raise or lower the sleeves 43, 43'. From the chambers 37, 37' the hot and cold water flows to the mixing valve casing 55 and the proportioning valve 59 regulates the proportion of hot and cold water admitted to the mixing chamber 57. The proportioning valve 59 is actuated by a regulating mechanism which includes the adjusting bar 87 connected at one end to the stem 81 of the valve and at its opposite end to the manually adjustable bar 89 controlled by hand wheel 97. As the adjusting bar 87 is rockably supported in the block 104, turning of the hand wheel 97 will move the bar 89 to rock the adjusting bar 87 to move the proportioning valve 59 up or down to initially adjust the valve to proportion the flow of hot and cold water admitted to the mixing chamber. Assuming the proportioning valve is initially adjusted to permit a flow of hot and cold water into the mixing chamber so that the mixed water has a temperature of 80 degrees. In order that the temperature of the mixed water will remain constant it is necessary to provide temperature responsive means for accurately adjusting the proportioning valve to alter the proportion of hot and cold water admitted to the mixing chamber. The thermostatic means in chambers 37, 37' are responsive to the change in temperature of the hot and cold water supplies respectively and actuate the sleeves 43, 43' which are connected to the pivoted members 107 and 108, respectively, of the regulating mechanism for adjusting bar 87. As the members 107 and 108 are interconnected with the block 104 any movement of the members will be transmitted through the block to the adjusting bar to adjust the proportioning valve. Assuming the initial temperature of the hot water is 152 degrees and the temperature of the cold water is 40 degrees and proportioning valve 59 has been manually adjusted so the temperature of the mixed cold and hot water in the mixing chamber is 80 degrees. If the temperature of the hot water increases the thermostatic means in chamber 37 will respond to the change in temperature of the hot water and raise sleeve 43 upwardly thereby moving the member 107 to actuate the adjusting bar 87 to adjust proportioning valve 59 to decrease the flow of hot water and increase the flow of cold water to the mixing chamber so that the temperature of the mixed hot and cold water remains at 80 degrees. If the temperature of the hot water decreases then the thermostatic means will move the member 107 in the opposite direction to operate the proportioning valve so that the proportion of hot water to cold water admitted to the mixing chamber is increased. Likewise a change in the temperature of the cold water in chamber 37' will actuate the thermostatic means to operate member 108 to adjust the proportioning valve to change the proportion of cold and hot water admitted to the mixing chamber to maintain the temperature of the mixed hot and cold water at 80 degrees. As the members 107 and 108 are interconnected with block 104 the movement of the members will be co-related to accurately move the bar 87 to regulate the proportioning valve 59 to maintain the temperature of the water in the mixing chamber at a constant pre-determined degree.

It is to be understood that the form of my invention herein shown and described is to be taken as a preferred example of the same and that changes in the shape, size and arrangement of the parts may be made without departing from the spirit of the invention or the scope of the subjoined claims.

Having thus described my invention, I claim:

1. A fluid temperature regulator of the character described comprising a mixing chamber having hot and cold fluid inlets, a valve to proportionately control the flow of hot and cold fluids to said mixing chamber, manually operable means for setting said valve to first obtain a relative flow of hot and cold fluids to said chamber, independent thermal elements actuated by the change in temperature of the hot and cold fluids and means connecting said thermal elements with said manually operable means, said means being actuated by the thermal elements to adjust the setting of the manually operable means whereby the relative flow of hot and cold fluid to said chamber is regulated in accordance with the temperatures of the fluids.

2. A fluid temperature regulator of the character described comprising a mixing valve chamber having hot and cold fluid inlets, a valve to control the proportionate flow of hot and cold fluids to said mixing chamber, an adjustable bar for setting said valve to first obtain a relative flow of hot and cold fluids to said chamber, independent thermal means actuated by a change in temperature of the hot and cold fluids, and independent means actuated by said thermal means to change the setting of said adjusting bar, said last mentioned means being interconnected so that the movement of one influences the movement of the other.

3. A fluid temperature regulator of the character described comprising a mixing valve chamber having hot and cold fluid inlets, a valve to control the proportionate flow of hot and cold fluids to said mixing chamber, a bar for adjusting said valve to regulate the proportion of hot and cold fluid admitted to said mixing chamber, independent thermal elements actuated by the changes in temperature of the hot and cold fluids, and interconnected means actuated by said thermal elements operable to alter the position of said bar in accordance with the change in temperature of the hot and cold fluids.

4. A fluid temperature regulator of the character described comprising a mixing valve chamber having hot and cold fluid inlets, a valve to control the proportionate flow of hot and cold fluids to said mixing chamber, a valve actuating bar having one end operatively connected to said valve and its opposite end pivotally mounted for adjustment, a pivot block movable on said bar rockably supporting said bar, pivoted members on opposite sides of said valve actuating bar disposed in crossed relation to each other and to said bar, said members having pivotal and sliding connection with said block, and thermal elements actuated by the changes in temperature of the hot and cold fluids operatively connected with said pivoted members to move the same to adjust the valve actuating bar.

5. A fluid temperature regulator of the character described comprising a mixing valve chamber having hot and cold fluid inlets, a valve to control the proportionate flow of hot and cold fluids to said mixing chamber, a valve actuating bar having one end operatively connected to said valve and its opposite end pivotally mounted, slidable means rockably supporting said actuating bar, pivoted members interconnected together and to said slidable means for raising and lowering the actuating bar upon relative movement between the pivoted members, and independent thermal means actuated by the changes in temperature of the hot and cold fluids for moving said pivoted members to adjust the position of said valve actuating bar whereby the supply of hot and cold fluid to said mixing chamber is regulated in accordance with the temperatures of the fluids.

6. A fluid temperature regulator of the character described comprising a mixing chamber having hot and cold fluid inlets, a slide valve to proportionately control the flow of hot and cold fluids to said mixing chamber, a pair of opposed pivoted members movable towards and from each other, a valve actuating bar extending between said pivoted members having one end operatively connected to said slide valve and its opposite end connected to a fixed pivot, means rockably supporting said valve actuating bar, said means being pivotally and slidably connected to said pivoted members whereby movement of said members actuates said valve actuating bar to adjust said slide valve, and thermal means actuated by the changes in temperature of the hot and cold fluids for actuating said pivoted members to adjust the valve actuating rod whereby the supply of hot and cold fluids to said mixing chamber is regulated in accordance with the temperatures of the fluids.

7. A fluid temperature regulator of the character described comprising a mixing valve chamber having hot and cold fluid inlets, a slide valve for controlling the flow of hot and cold fluids to the mixing chamber, a valve actuating bar pivotally connected to one end of the slide valve, an adjustable bar pivotally supporting the opposite end of said actuating bar, a block slidably mounted on said actuating bar and rockably supporting the same, opposed pivoted members straddling said block, pintle pins extending from opposite sides of said block having pivotal and sliding connection with said members whereby relative movement of said members will raise or lower said block, and independent thermal means actuated by the changes in temperature of the hot and cold fluids for operating said pivoted members to adjust the position of said actuating bar whereby the slide valve is regulated to control the supply of hot and cold fluid in accordance with the temperatures of the fluids.

8. A fluid temperature regulator of the character described comprising a fluid pressure equalizing chamber having hot and cold fluid inlets and outlets, a pressure equalizing valve controlling the flow of hot and cold fluids from the outlets, a thermostat chamber connected with each of the fluid outlets of said equalizing chamber, a coil tubing within said thermostat chamber, an expansible bellows connected with said tubing, said bellows and tubing being filled with a thermal expansible fluid for actuating said bellows, a mixing valve chamber having connection with each thermostat chamber, a valve to proportionately control the flow of hot and cold fluid to the mixing chamber, manually operable means for setting said valve to first obtain a relative flow of hot and cold fluid to said mixing chamber, and means operable by said bellows for changing the setting of the manually operable means in accordance with the temperatures of the fluids whereby said valve is regulated to obtain a mixture of constant temperature.

9. A temperature regulating mechanism for fluid mixing devices comprising a mixing valve chamber having hot and cold fluid inlets, a valve to proportionately control the flow of hot and cold fluids to said mixing chamber, a pivoted actuating bar for manually setting said valve to first obtain a relative flow of hot and cold fluids to said chamber, a block slidably mounted on said actuating bar, opposed pivoted members operatively connected with said block for actuating the same to change the setting of said actuating bar, and separate thermostats actuated by the temperature of the hot and cold fluids for operating each of said pivoted members whereby the actuating bar is adjusted to obtain a mixture of fluids of constant temperature.

10. A temperature regulating mechanism for fluid mixing devices comprising a mixing chamber having hot and cold fluid inlets, a valve to proportionately control the flow of hot and cold fluids to said mixing chamber, manually operable means for setting said valve to first obtain a relative flow of hot and cold fluids to said chamber, a pair of interconnected movable members operatively connected to said manually operable means for adjusting the same upon relative movement of said members, and separate thermal elements actuated by the temperature of the hot and cold fluids controlling the relative movement of said movable members whereby the valve is regulated to maintain a fluid mixture of constant temperature.

CLEBURNE B. HATFIELD.

REFERENCES CITED

The following references are of record in the file of this patent:

UNITED STATES PATENTS

| Number | Name | Date |
|---|---|---|
| 1,807,040 | Leonard | May 26, 1931 |
| 1,985,929 | Jorgensen | Jan. 1, 1935 |
| 2,250,815 | Ruegg | July 29, 1941 |
| 2,383,215 | Reynolds | Aug. 21, 1945 |

FOREIGN PATENTS

| Number | Country | Date |
|---|---|---|
| 135,591 | Austria | Nov. 25, 1933 |